United States Patent
Zigante et al.

(10) Patent No.: US 10,875,219 B2
(45) Date of Patent: Dec. 29, 2020

(54) METHOD AND APPARATUS FOR INJECTION MOLDING OF PLASTIC MATERIALS

(71) Applicant: INGLASS S.p.A., San Polo di Piave (IT)

(72) Inventors: Andrea Zigante, San Polo di Piave (IT); Claudio Dall'acqua, San Polo di Piave (IT)

(73) Assignee: INGLASS S.p.A., San Polo di Piave (IT)

( * ) Notice: Subject to any disclaimer, the term of this patent is extended or adjusted under 35 U.S.C. 154(b) by 0 days.

(21) Appl. No.: 16/715,342

(22) Filed: Dec. 16, 2019

(65) Prior Publication Data
US 2020/0114552 A1    Apr. 16, 2020

Related U.S. Application Data

(62) Division of application No. 14/963,874, filed on Dec. 9, 2015, now Pat. No. 10,543,629.

(30) Foreign Application Priority Data

Dec. 11, 2014    (IT) .......................... TO2014A001030

(51) Int. Cl.
*B29C 45/00*    (2006.01)
*B29C 45/76*    (2006.01)
*B29C 45/28*    (2006.01)

(52) U.S. Cl.
CPC .......... *B29C 45/0025* (2013.01); *B29C 45/76* (2013.01); *B29C 45/281* (2013.01);
(Continued)

(58) Field of Classification Search
CPC ... B29C 45/231; B29C 45/76; B29C 45/0025; B29C 45/18; B29C 45/281;
(Continued)

(56) References Cited

U.S. PATENT DOCUMENTS

| 5,062,785 A | 11/1991 | Stroud, III et al. |
| 7,588,436 B2 * | 9/2009 | Tooman ................ B29C 45/281 |
| | | 425/146 |
| 2004/0262813 A1 | 12/2004 | Pierick et al. |

FOREIGN PATENT DOCUMENTS

| CN | 1460586 A | 12/2003 |
| CN | 103072244 A | 5/2013 |

(Continued)

OTHER PUBLICATIONS

Kazmer, D. and Barkan, P. (1997), Multi-cavity pressure control in the filling and packing stages of the injection molding process. Polym Eng Sci, 37: 1865-1879, doi: 10.1002/pen.11837 (Year: 1997).*

(Continued)

*Primary Examiner* — Galen H Hauth
(74) *Attorney, Agent, or Firm* — RMCK Law Group, PLC

(57) ABSTRACT

A method for injection molding of plastic materials into a cavity of a mold by means of a molding apparatus including at least one injector having a pin valve displaceable between a fully closed position and a maximum opening position, and vice versa, in a controlled fashion in respect of its position and speed. In the opening displacement from the fully closed position to the maximum opening position, the pin valve is initially moved at a first speed and subsequently at a second speed, where the first speed is the highest opening displacement speed of the pin valve.

6 Claims, 5 Drawing Sheets

(52) U.S. Cl.
CPC ............... *B29C 2045/2824* (2013.01); *B29C 2045/2872* (2013.01); *B29C 2945/76598* (2013.01); *B29C 2945/76755* (2013.01)

(58) Field of Classification Search
CPC .... B29C 2045/2872; B29C 2045/2824; B29C 2045/1792
See application file for complete search history.

(56) References Cited

FOREIGN PATENT DOCUMENTS

| | | | |
|---|---|---|---|
| JP | H05269750 | A | 10/1993 |
| JP | 2002292683 | A | 10/2002 |
| JP | 2003039501 | A | 2/2003 |
| JP | 2013091211 | A | 5/2013 |
| JP | 2013539425 | A | 10/2013 |

OTHER PUBLICATIONS

Brazilian First Office Action with the list of references cited, dated Dec. 18, 2019. 4 Pages.

\* cited by examiner

FIG. 9
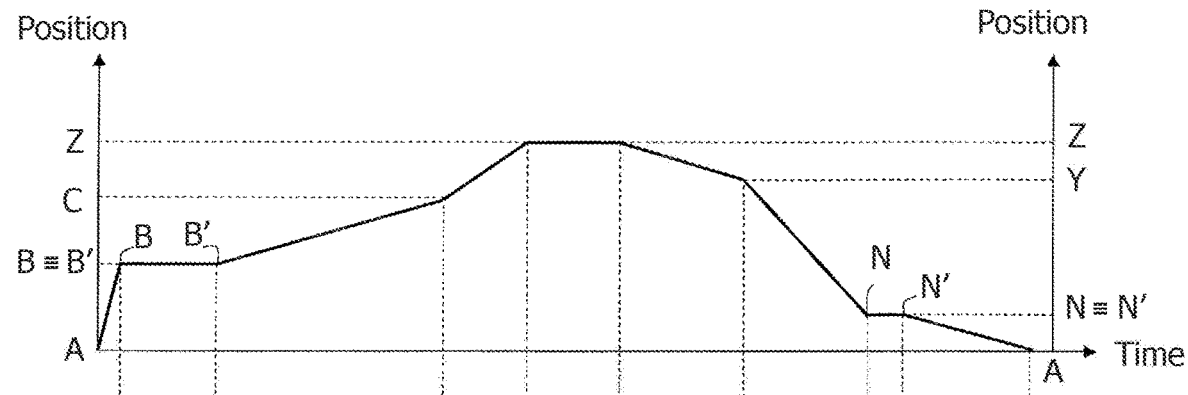
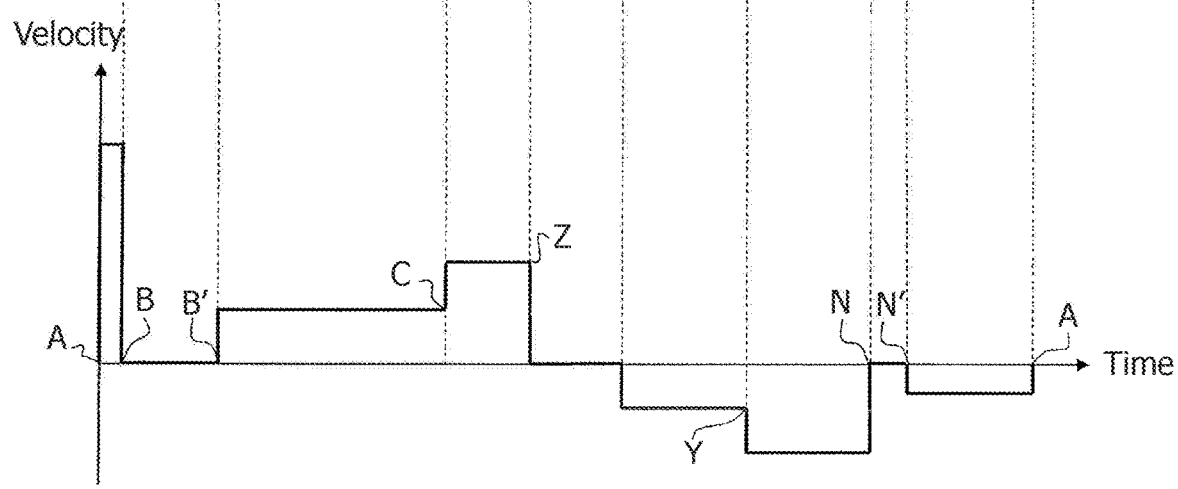
FIG. 10

METHOD AND APPARATUS FOR INJECTION MOLDING OF PLASTIC MATERIALS

CROSS REFERENCE TO RELATED APPLICATIONS

This application is a divisional of U.S. application Ser. No. 14/963,874 filed on Dec. 9, 2015, and claims priority to Italian Patent Application No. TO2014A001030 filed on Dec. 11, 2014, the entire disclosure of these applications is incorporated herein by reference.

FIELD OF THE INVENTION

The present invention refers to the injection molding of plastic materials and more in particular it regards a method for injection molding by means of an apparatus comprising a distributor of fluid plastic material under pressure connected to at least one injector including a pin valve displaceable between a fully closed position and a maximum opening position and vice versa.

Typically, these injection molding methods comprise a step for filling the mold cavity with the plastic material following the displacement of the pin valve from the closed position to the maximum opening position, followed by a step of packing the plastic material injected under pressure into the cavity, in which the pin valve is held in the maximum opening position. The pin valve is then displaced from the maximum opening position to the fully closed position and the molded detail is removed from the mold after a waiting period to allow the plastic material to solidify.

The displacements of the pin valve or each injector are conventionally carried out through a fluid actuator. Apparatus in which the pin valve is operated by a rotary electric actuator, in a controlled fashion through electronic systems, have been proposed over the recent times.

STATE OF THE PRIOR ART

The use of electrical actuators for operating the pin valve of the or of each injector of the molding apparatus is for example described in documents JP-06114887, U.S. Pat. No. 7,121,820 and EP-2679374 (on behalf of the Applicant). The electrical actuators, compared with the fluid actuators, are much easier to control utilizing electronic systems which operate according to process parameters, detected through special sensors and/or through specific algorithms. This allows efficiently controlling the position of the pin valve between the closed position and the opening position to vary the flow of the plastic material injected during the molding cycle, for example as described in U.S. Pat. No. 6,294,122 as well as the displacement speed of the pin valve during the displacement movement thereof from the closed position to the opening position. Thus, documents WO-2012/074879 and WO-2012/087491 provide for controlling the electrical actuator to displace the pin valve in a continuous fashion from the closed position to the opening position initially at an initial speed and then at one or more speeds higher than the initial speed. Such control is carried out as a function of time or the space covered by the pin valve starting from the closed position thereof.

This type of control is difficult to correlate with the actual process conditions, i.e. a series of considerably variable parameters for example as a function of variation of the operating conditions and the physical state of the plastic material as well as the pressure of the plastic material supplied to the injector.

In particular, the injection pressure in the distributor is maximum in the moments preceding the opening of the pin valve and thus the injection gate of the mold. In these conditions, a considerable displacement opening of the pin valve may create surface defects on the molded piece in proximity of the gate due to the rapid and concentrated discharge of the injection pressure. These aesthetic defects, corresponding to the flow lines of the injected plastic material, may be evident and unacceptable at times.

Other considerable aesthetic effects may arise, at the end of the pin valve closing step, due to possible seepage of the plastic material towards to gate.

A more accurate control is thus particularly desirable for the injection molding of details that require high quality both from a mechanical and aesthetic point of view.

SUMMARY OF THE INVENTION

The object of the present invention is to provide an efficient solution to the aforementioned technical problem, through a control of the injection process capable of allowing limiting or entirely eliminating the aforementioned defects from the molded pieces, by acting on the position and speed of the pin valve of the or of each molding apparatus injector through a new and innovative control of the relative electrical actuator in the entire opening and closing cycle.

With the aim of attaining this object, the invention aims at providing an injection molding method of the type defined in the introduction, in which the opening displacement from the fully closed position to the maximum opening position the pin valve is initially moved at a first speed and subsequently at a second speed, whose main characteristic lies in the fact that said first speed is higher than said at least one second speed.

Thanks to this solution idea, a partial vacuum of the molding apparatus distributor occurs at the start of the injection cycle, due to which the surface quality of the molded pieces may be improved considerably.

The first speed is conveniently the highest opening displacement speed of the pin valve, which is moved at such first speed from the fully closed position up to a partial opening position. In this partial opening position, the pin valve is temporarily stopped for a determined time, thus displacement thereof towards the maximum open position is non-continuous.

According to another aspect, the method according to the invention is further characterized in that the pin valve is displaced from the maximum opening position towards the fully closed position temporarily stopping for an established period of time in a partial closing intermediate position, thus also the displacement thereof towards the fully closed position is non-continuous.

Another distinctive characteristic of the invention lies in the fact that at the end of said determined stop time in the partial closing intermediate position, a torque, which is predetermined as a function of process parameters, is applied to the electrical actuator so as to displace the pin valve from the intermediate partially closed position to the fully closed position.

This characteristic allows obtaining, at the end of the injection cycle, a "forced closing" of the gate which allows guaranteeing the absence of seepage of plastic material and thus further advantageous effects in terms of improved aesthetic quality of the molded pieces.

The invention also regards an apparatus for implementing the injection molding method.

BRIEF DESCRIPTION OF THE FIGURES

The invention will now be described in detail, purely by way of non-limiting example, with reference to the attached drawings, wherein:

FIG. 9 is a diagram representing the position of the pin valve as a function of time during the steps of the method according to the invention represented in FIGS. 1 to 8, and FIG. 10 is a diagram showing the speed of the pin valve as a function of time, correlated to the positions thereof represented in FIG. 9.

DETAILED DESCRIPTION OF THE INVENTION

Figure 1:
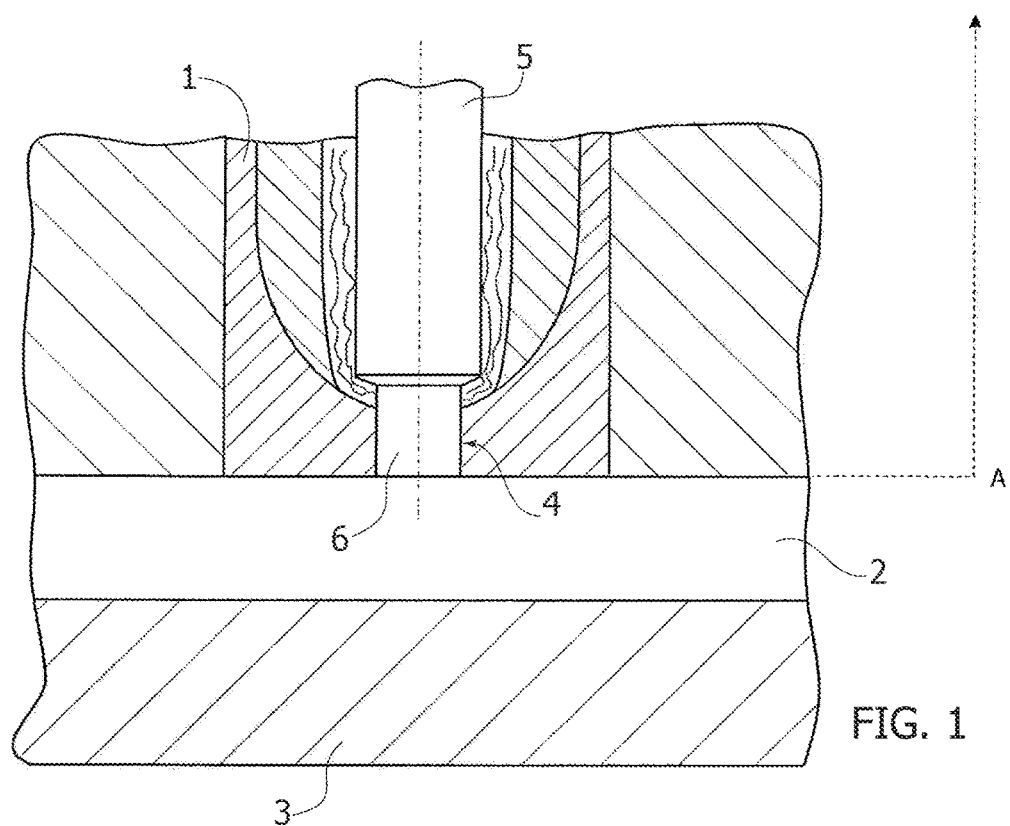
FIG. 1 is partial schematic and axial sectional view showing a part of an injection molding apparatus represented in a first step of the method according to the invention.
Figure 5:
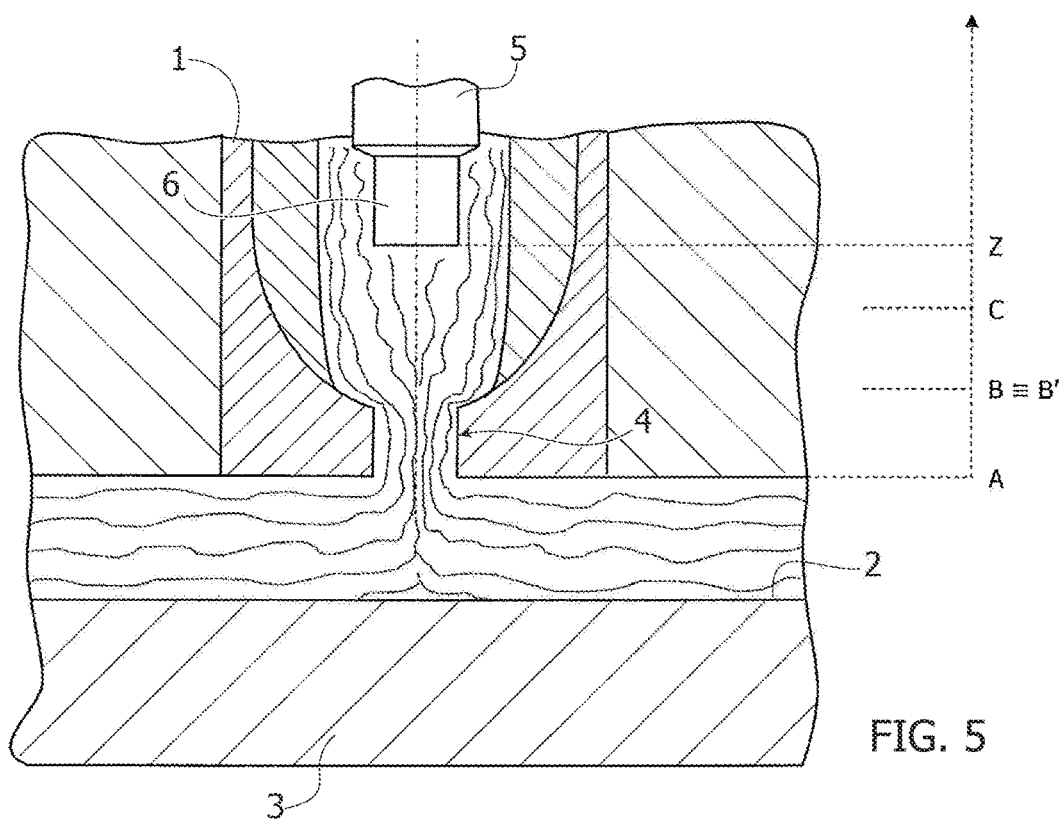

FIG. 1 schematically shows a part of the apparatus for injection molding of plastic materials, in a generally conventional manner and as described in the previously mentioned document EP-2679374 on behalf of the Applicant, an element for distributing the molten plastic material or hot chamber which supplies the plastic material to one or more injectors each comprising a nozzle generally indicated with 1 in communication with the cavity 2 of a mold 3 through an injection gate 4. The flow of the plastic material through the gate 4 is controlled by a pin valve 5 which can be axially displaced along the nozzle 1 through an actuator (not illustrated) between a fully closed advanced position represented in FIG. 1 and a maximum opening receded position illustrated in FIG. 5.

The pin valve 5 is capable of accurately varying the flow rate of the plastic material which traverses the gate and enters into the cavity 2 of the mold 3 between a null value (fully closed position) and a maximum value (maximum opening position), and vice versa.

In the case of the illustrated example, the tip of the pin valve 5 cooperating with the gate 4, indicated with 6, is cylindrical-shaped: alternatively, it could be frusto-conical shaped.

The actuator which controls the displacements of the pin valve 5 is an electrical actuator, and a rotary electric motor more in particular. It is not represented for the sake of illustration simplicity and it is for example of the type described and illustrated in the aforementioned document EP-2679374 on behalf of the Applicant, in which the shaft of the rotary electric motor drives the pin valve 5 through a transmission including a screw and nut group as well as an oscillating lever.

The electric motor is in turn operatively connected to a programmable electronic control unit and configured to drive the pin valve 5 in a controlled fashion according to its position and its displacement speed. The control may be carried out as a function of operative parameters of the molding apparatus, such as for example the pressure of the plastic material injected into the cavity 2 of the mold 3, and/or preset parameters.

Following is a description of the opening cycle (upstream) and closing cycle (downstream) of the pin valve 5 carried out according to the method according to the invention, which allows guaranteeing an optimal surface quality of the molded piece.

Filling Step

The injection pressure in the nozzle 1 is maximum in the moments preceding the opening of the gate 4. In these conditions, a considerable displacement opening of the pin valve 5 may create surface defects on the molded piece in proximity of the gate 4, due to the rapid and concentrated discharge of the injection pressure. In particular, the flow lines of the injected material are observable on the molded piece in this case.

Figure 2:
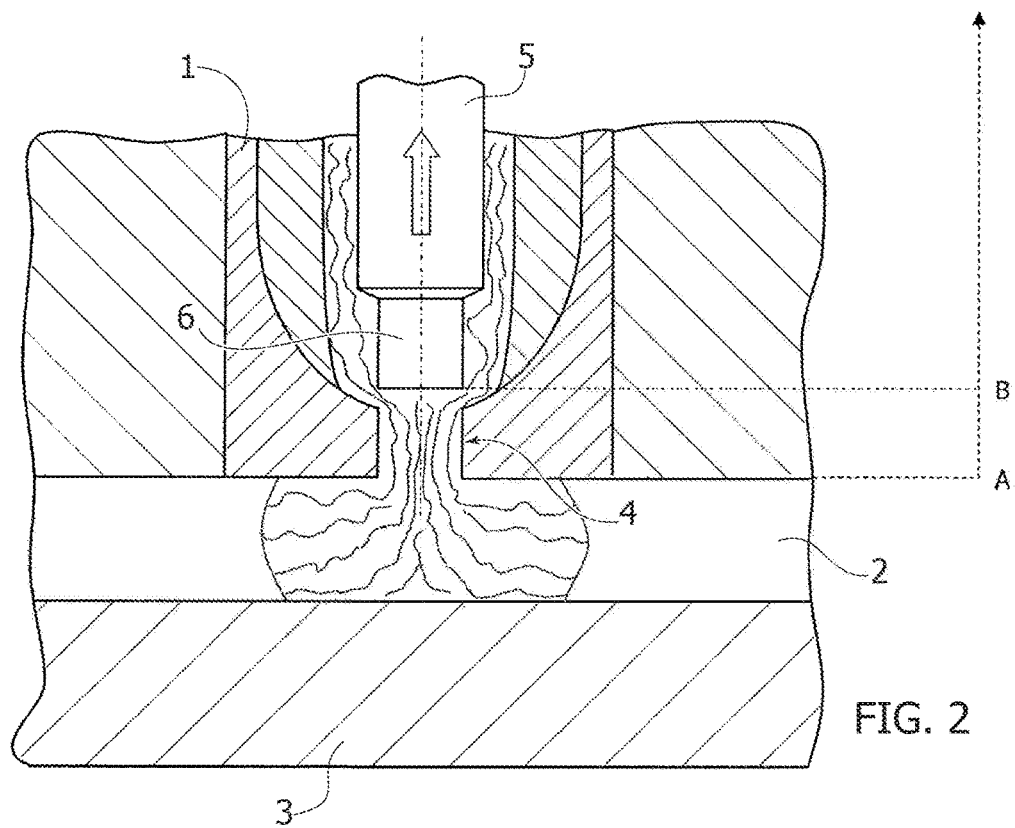
FIGS. 2 to 8 are views similar to FIG. 1 showing further steps of the method according to the invention.
Figure 3:
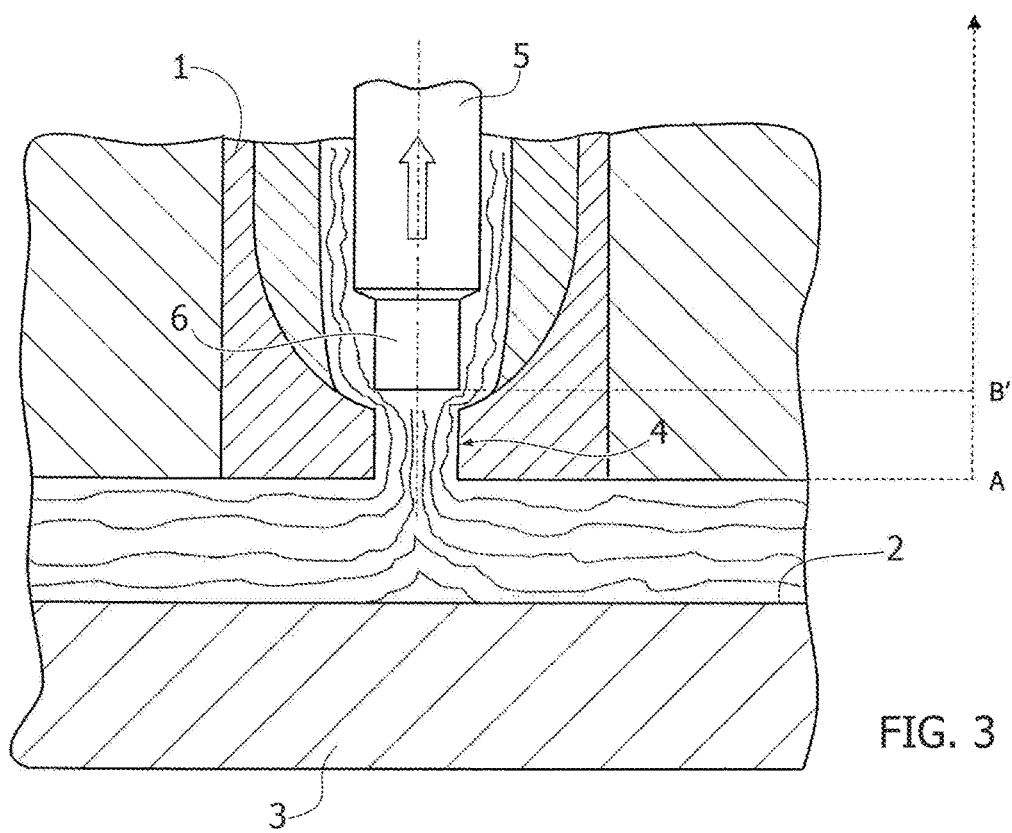

The concept on which the present invention is based is to limit or entirely eliminate this type of defects, by acting on the accurate control of position and speed of the pin valve 5 through the electrical actuator and the relative electronic control unit. In particular, the invention provides for performing an initial partial decompression of the nozzle 1 and the distributor or hot chamber of the molding apparatus, through the following distinctive methods:

with reference to FIG. 1, the pin valve 5 initially has its tip 6 (cylindrical or frusto-conical shaped as mentioned) in the fully closed position A of the gate 4. The injection pressure in the hot chamber and acting in the nozzle 1 of the injector is maximum;

the pin valve 5 is initially moved at a maximum speed from among the speeds observable over the entire opening step up to a first position B of partially opening the gate 4, suitably set in the electronic control unit. The position B is such that a minimum gap is left for the material to flow outside the gate 4 and start filling the mold cavity (FIG. 2). However, such minimum gap should not degrade the material;

position B is thus held while the flow material fills the cavity 2 of the mold to a point such to be able to correctly read the injection pressure by means of special sensors. Pressure measurement may be carried out using sensors placed in the cavity, or indirectly by reading the torque of the electric motor, as described in the Italian patent application n° TO2014A000701 on behalf of the Applicant, not published as of date of filing of the present application. The pin valve 5 is held stationary in B until the injection pressure reaches a determined value in the electronic control unit (point B', FIG. 3). Thus, the high initial pressure is discharged in a controlled and not sudden fashion, limiting or eliminating the corresponding surface defects of the molded piece, in proximity of the gate 4.

Figure 4:
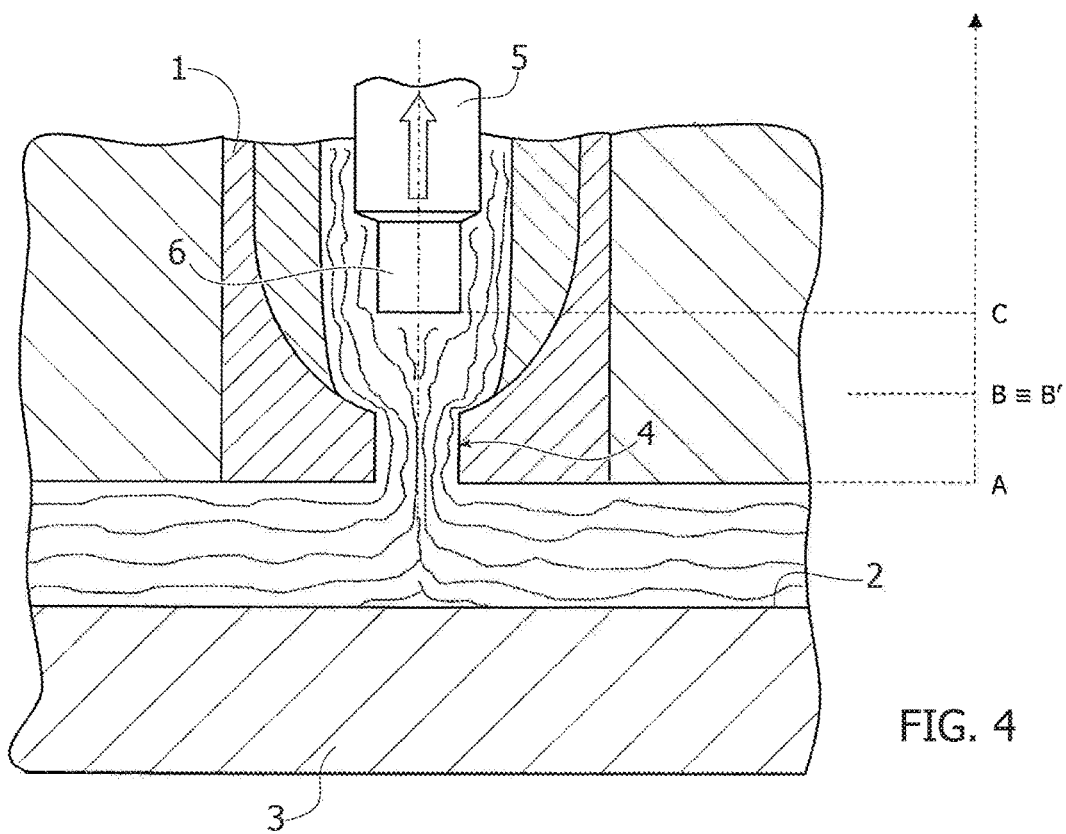

Alternatively, position B is held for a preset period of time in the electronic control unit, for example obtained as a result of a dynamic process simulation or subsequent attempts during the step of starting the molding apparatus, evaluating the surface obtained each time;

upon reaching the desired pressure, or the end of the preset period of time, the pin valve 5 is further moved upstream up to the partial opening position C, according to a generic optimal cycle for filling the programmed piece in the electronic control unit (FIG. 4). The opening speed from B' and C is however always lower than the initial section A-B;

the pin valve 5 is further moved upstream up to the maximum opening position Z (FIG. 5), not necessarily coinciding with the top dead centre of the pin valve stroke (100%). The opening speed of the section C-Z may be indistinctively higher, lower or equal (constant speed) with respect to the preceding section B'-C, depending on the optimal cycle set in the electronic control unit. In any case, it will always be lower than the initial section A-B.

Further positions D, E, F etc., identifying corresponding sections C-D, D-E etc. may be possibly provided for between position C and position Z. The speed profile outlined between B' and Z through the single sections B'-C, C-D, D-E, E-F, etc., may be variously shaped, as a function of the optimal cycle programmed in the electronic control unit (not necessarily constant or monotone increasing speed). The speed of each single section comprised between B' and Z shall definitely always be lower than that of the first section A-B.

upon reaching the maximum opening position Z, the cycle continues with the step of packing the plastic material in the cavity 2 of the mold 3. The position Z may possibly be held fixed (null speed) for a determined period of time between the end of the filling step and the start of the packing step.

Packing Step

During the packing step, the torque applied by the electric motor promptly and automatically varies to adapt the closing cycle of the preset pin valve 5, as a function of the observed surrounding conditions (e.g. pressure). At the end of the cycle, the pin valve 5 should close the gate thus guaranteeing the absence of seepage.

For this purpose, the invention provides for applying in the last section of the pin valve closing stroke a torque value preset in the electronic control unit as a function of the process conditions (for example material, pressure) which allows obtained a "forced" mechanical closing of the gate 4 and guarantee of absence of seepage.

Figure 6:
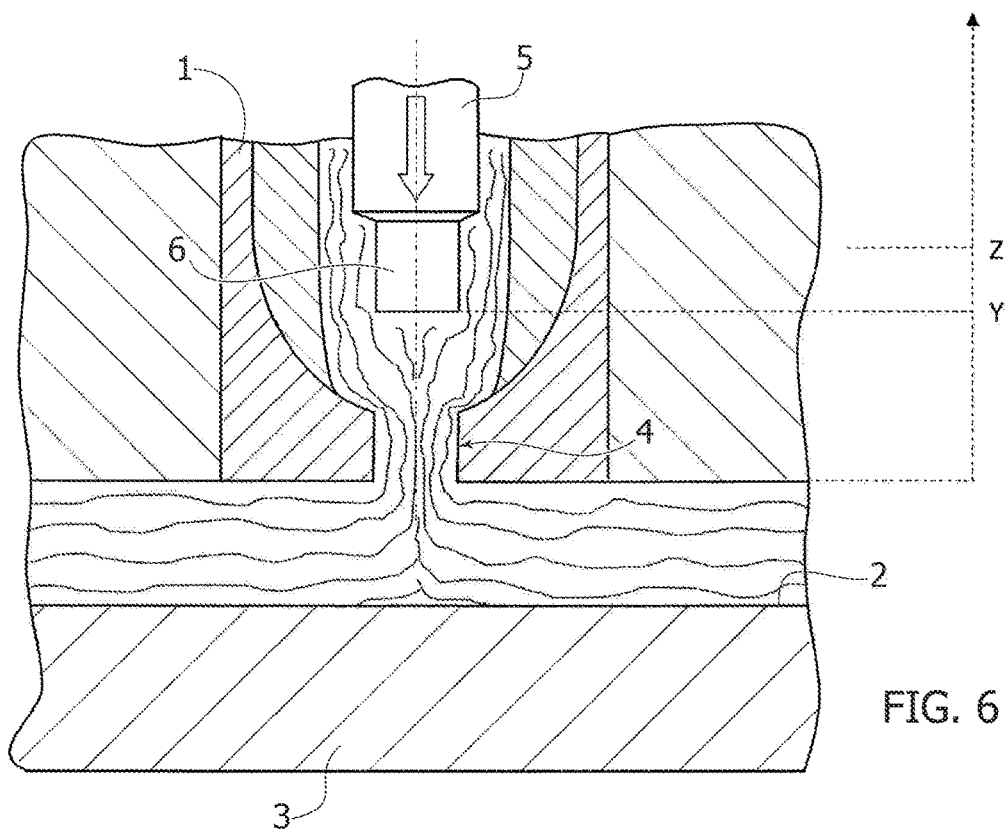
Figure 7:
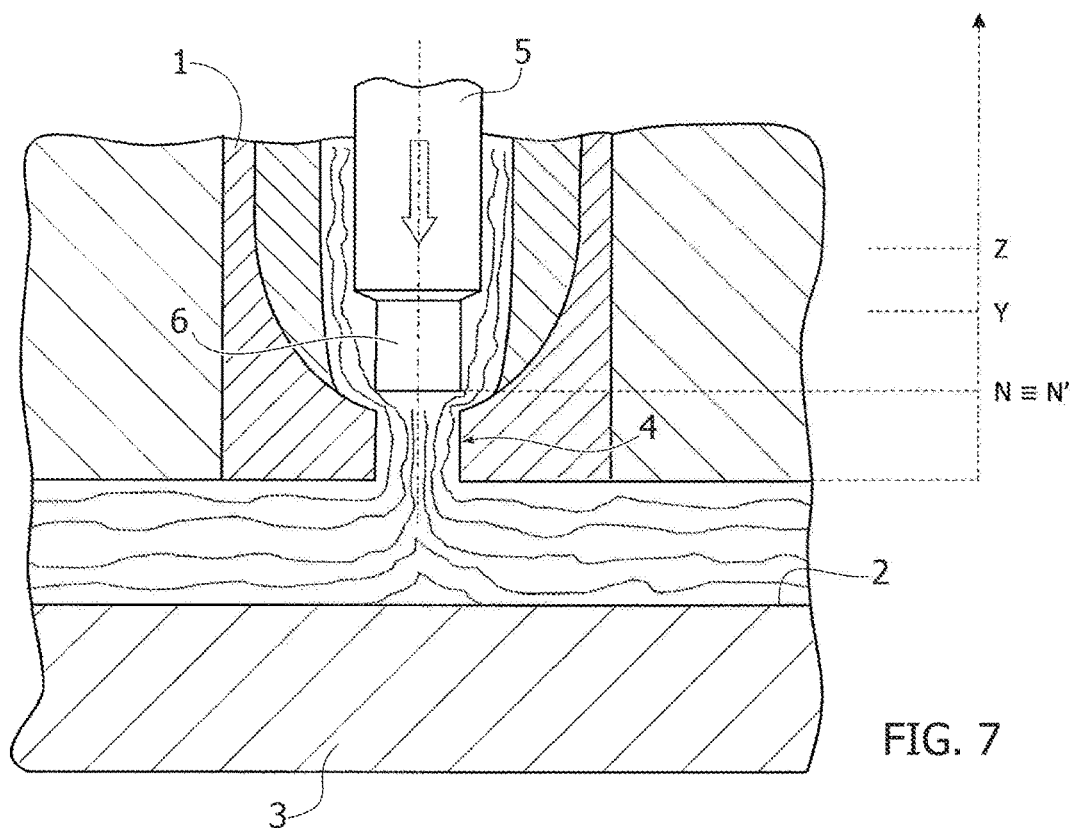
Figure 8:
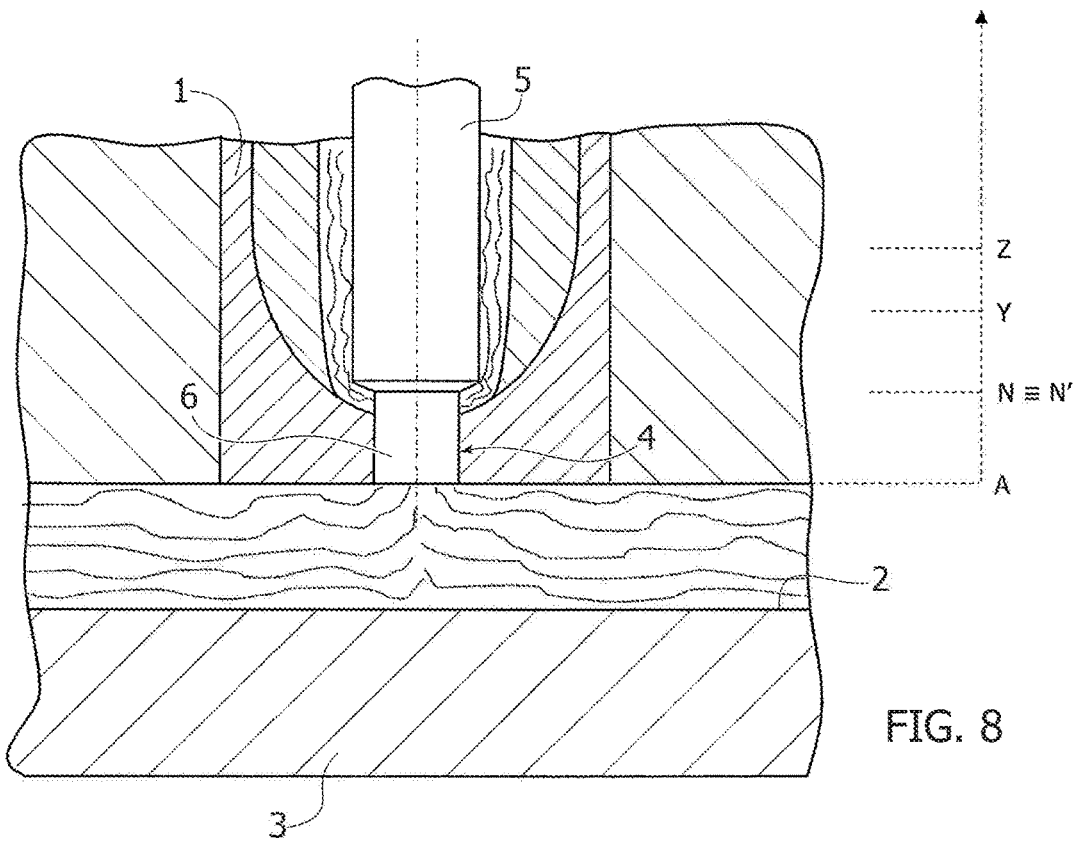

The closing cycle according to the invention is carried out as follows:

from the maximum opening position Z, the pin valve 5 is moved downstream towards the gate 4, passing through one or more intermediate positions Y, X, W, etc. (FIG. 6). The closing speed profile observable for each of the single sections Z-Y, Y-X, X-W etc. possibly present, may be variously shaped as a function of the cycle set in the electronic control unit (not necessarily constant or monotone decreasing speed, but there could for example be sections at null speed);

the pin valve 5 continues in its downstream travel up to the partial closing position N in proximity of the gate 4 (the distance may for example be 1 mm). Such position is held for a brief period of time preset in the electronic control unit (point N', FIG. 7);

from position N', a torque preset as a function of the process parameters (for example material, pressure) is applied to the pin valve 5, due to which it reaches the fully closed position A of the gate 4, guaranteeing the absence of seepage and completing the packing step (FIG. 8) with suitable safety margin. Typically, the closing speed of the last section shall be relatively slow.

FIGS. 9 and 10 respectively show the position and speed profile during a generic full opening and closing cycle of the pin valve 5 actuated according to the method according to the previously described invention, and whose main distinctive characteristics in respect to controlling the position and speed of the pin valve 5 are summarized below:

opening in section A-B at maximum speed from among the speeds observable in the opening step;

holding position B (null speed) up to reaching a preset pressure in the mold cavity (point B'), or up to the end of a preset period of time;

speed profile between B' and Z may vary but always with the opening speed of the single sections lower than that of the initial section A-B;

holding position N in proximity of the gate (null speed) for a preset brief period of time, before applying the preset "forced" closing torque (point N'), established as a function of the process parameters;

closing N'-A due to the application of the preset torque;

movements of the pin valve both for non-continuous, i.e. discontinuous, opening and closing.

Lastly, it should be observed that though the invention has been described with reference to a single injector, it particularly advantageously applies to a cascade or sequential injection with the use of multiple injectors.

The invention claimed is:

1. An apparatus for injection molding of plastic materials in cavity of a mold to create a molded article during an injection cycle comprising at least one injector supplied with fluid plastic material under pressure and including a pin valve displaceable between a fully closed position and a maximum opening position, and vice-versa, wherein the pin valve is driven by an electrical actuator connected to an electronic control unit controlling the position and the speed of the pin valve during displacements thereof, wherein the pin valve during opening displacement from the fully closed position to the maximum opening position is initially moved at a first speed and thereafter at at least one second speed, and wherein said electronic control unit is configured so that the first speed is higher than the or each second speed and it is a highest maximum speed of opening displacement of the pin valve sufficient to create a partial vacuum of a distributor of the molding apparatus at a start of the injection cycle thereby improving a surface quality of the molded article.

2. The apparatus according to claim 1, wherein said electronic control unit is further configured so that the opening displacement and the closing displacement of the pin valve are both non-continuous, comprising at least one time interval wherein the speed of the pin valve is null.

3. The apparatus according to claim 1, wherein said electronic control unit is further configured so that the pin valve is displaced from the maximum opening position to an intermediate partially closed position at which a torque is applied to the electrical actuator which is predetermined as a function of process parameters, so as to displace the pin valve to the fully closed position.

4. The apparatus according to claim 1, wherein said electronic control unit is further configured so that the pin valve is displaced at said first speed from said fully closed position to a partially open position such that a distal end of the pin valve is proximate an entrance to a gate of the mold and partially obstructing flow of the plastic materials into the gate.

5. The apparatus according to claim 4, wherein said electronic control unit is further configured so that the pin valve at said partially open position is temporarily stopped for a determined period of time, whereby displacement thereof towards the maximum open position is non-continuous.

6. The apparatus according to claim 1, wherein said pin valve has a cylindrical or frusto-conical tip.

* * * * *